March 24, 1931.  H. D. SCOTT  1,797,882
APPARATUS FOR TESTING MULTIPLE WELDED PIPE
Filed July 27, 1928   2 Sheets-Sheet 2
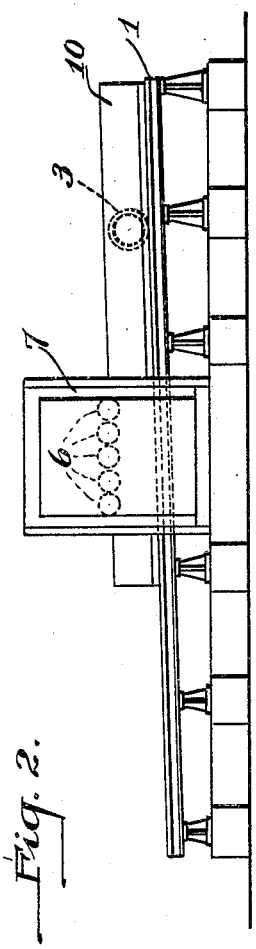
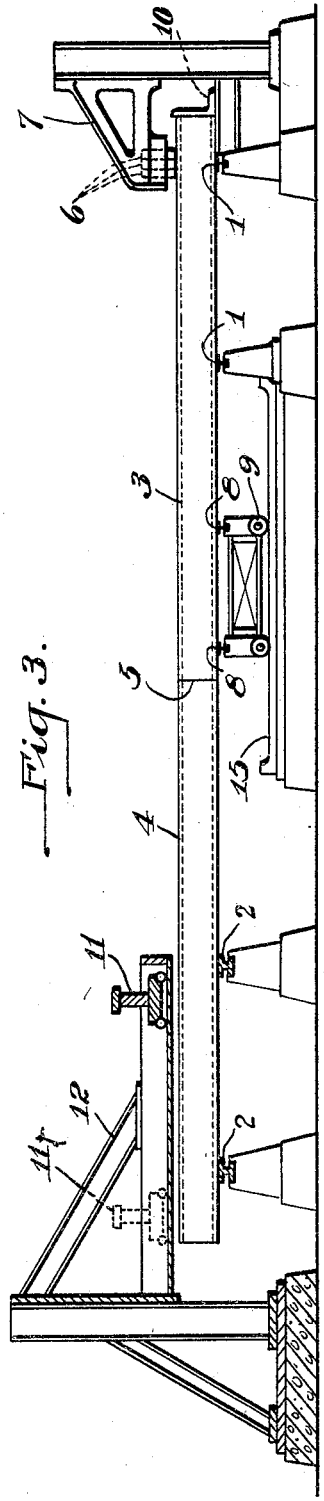
WITNESSES
INVENTOR
Henry D. Scott
by Brown & Critchlow
his attys Patented Mar. 24, 1931

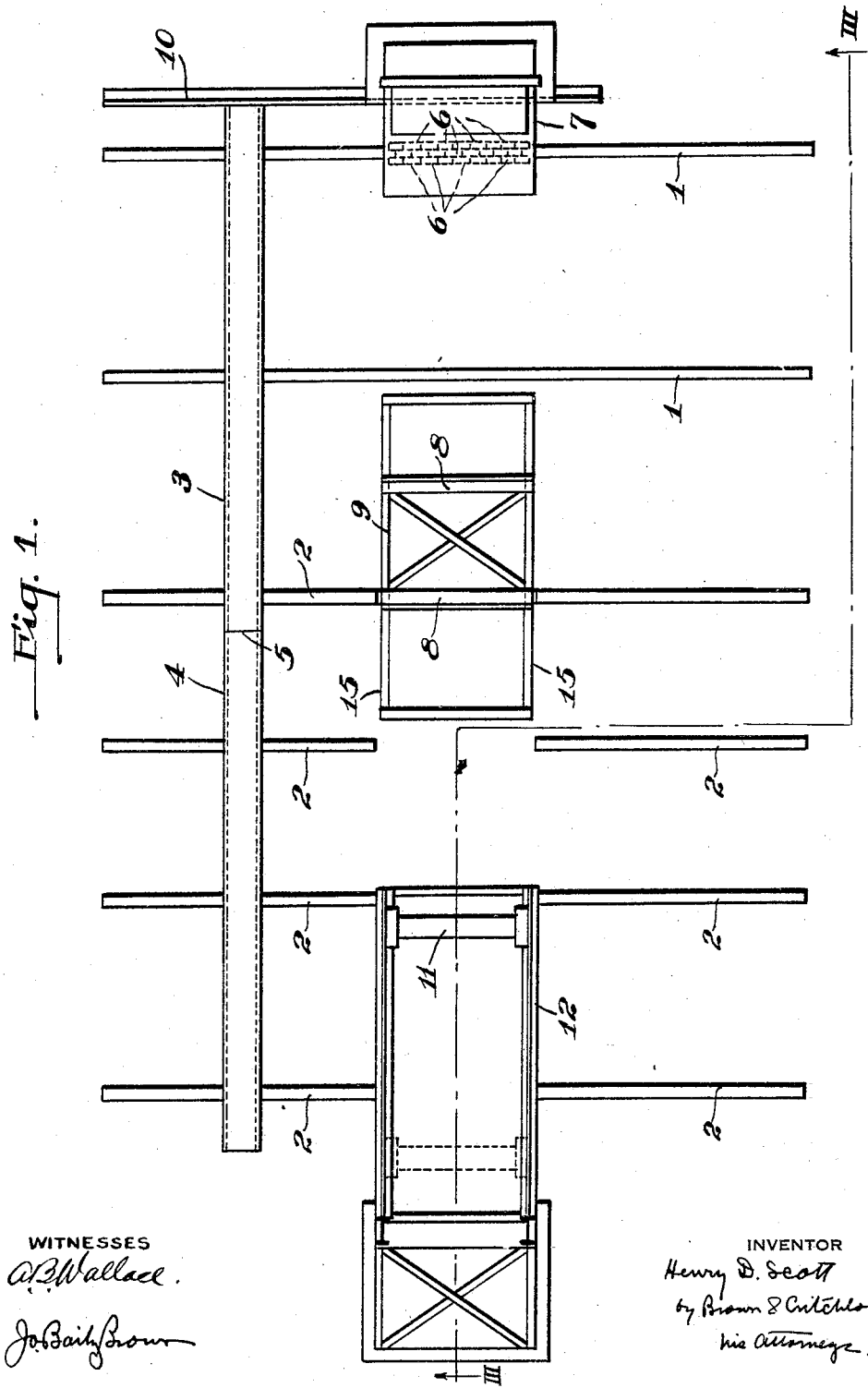
March 24, 1931. H. D. SCOTT 1,797,882
APPARATUS FOR TESTING MULTIPLE WELDED PIPE
Filed July 27, 1928 2 Sheets-Sheet 1

1,797,882

UNITED STATES PATENT OFFICE

HENRY D. SCOTT, OF WHEELING, WEST VIRGINIA, ASSIGNOR TO WHEELING STEEL CORPORATION, OF WHEELING, WEST VIRGINIA, A CORPORATION OF DELAWARE

APPARATUS FOR TESTING MULTIPLE-WELDED PIPE

Application filed July 27, 1928. Serial No. 295,788.

The invention relates to the testing for strength of weld joints between lengths of multiple welded pipe.

In laying some types of pipe line, such as for natural gas and the like, the joints between lengths of pipe are often made by welding. Such joints can be made more cheaply at the mill than in the field, and in order to reduce the cost of the pipe lines it is now common practice to weld two lengths of pipe in the pipe mills, which reduces by one-half the welds necessary in the fields. Such multiple welded pipe, however, are subject to rough treatment in handling and in transportation, and many joints which would be satisfactory if made when the pipes are being laid, are damaged so as to render the pipes unfit for use without re-welding. It is thus important to test the welded pipe before leaving the mill, to make certain that the weld joints are sound and strong.

Testing of this multiple welded pipe by dropping it through a suitable distance is not satisfactory, partly because this is in effect a transverse bend test in which only the opposed elements of the joint normal to the direction of impact receive the maximum stress, and if a joint is defective at other points, the lower stresses created thereat may not suffice to reveal the fact that the joint is faulty. Furthermore, the pipe may be dented or otherwise damaged, and there is danger to the workmen. This type of test also interferes with and slows up the uniform and smooth progress of the material in a mill.

An object of the invention is to provide a rapid, efficient and safe method of and apparatus for testing weld joints between lengths of multiple welded pipe, which satisfactorily overcomes the disadvantages of the shock or impact method referred to.

Other objects are to provide a method of and apparatus for testing such joints which makes use of the principle of reaction moments of a transversely loaded beam, and which is applicable to pipes of varying lengths and diameter, which subjects each element of the joint to adequate testing stresses, and which can be performed in continuous fashion without materially increasing manufacturing costs, and without injury to the pipe.

In the accompanying drawings there is shown an apparatus which may be used in the practice of the invention. Fig. 1 is a plan view of the apparatus; Fig. 2 an elevation of the right hand end of the apparatus shown in Fig. 1; and Fig. 3 a side elevation partly in section taken on the broken line III—III, Fig. 1.

According to the invention the weld joint between lengths of multiple welded pipe is subjected to transverse bending stresses acting in one direction, and the pipe is simultaneously rotated to progressively subject the entire joint to both tension and compression.

The transverse loading may be, and preferably is, accomplished by so supporting the pipe that all or a portion of it acts as a simple beam, its weight creating bending moments whose maximum effect is exerted at, or substantially at, the weld joint. In the preferred embodiment, cantilever supporting is employed, that is the pipe is supported from one end up to a joint adjacent a weld joint, and the succeeding length is unsupported, although if desired the welded pipe may be supported at its ends.

Various means may be employed for supporting the pipe, such as a table or spaced tracks or guides. It is preferred to use a structure which initially supports the pipe along its full length, and which has a portion in which the supports are interrupted in such manner than an appropriate length of the pipe will be unsupported. Where one portion of the pipe is supported as a cantilever, in accordance with the preferred practice, suitable means are provided to prevent the unsupported portion from causing the pipe to tip about the cantilever support as a fulcrum. The interrupted portion is preferably wide enough so that in passing over it a pipe will turn through at least one complete revolution. Likewise, the pipe may be rotated in various ways, and, with a structure such as that referred to, any suitable means may be employed to roll the pipe over it. For simplicity or construction and operation, however, it is preferred to use an inclined structure, so that the pipes roll by gravity.

The process may be further described in connection with the accompanying drawings, which show a pipe-supporting structure comprising a plurality of uninterrupted spaced parallel tracks or rails 1 rigidly mounted in any suitable manner. Short tracks 2 disposed in opposed pairs parallel to tracks 1 form a pipe support which is interrupted intermediate of its end portions, as shown in Fig. 1. All of these rails are mounted in an inclined plane, as shown in Fig. 2, to provide a trackway which initially supports the full length of a multiple welded pipe made up of lengths 3 and 4 welded at 5.

The pipe is positioned on the trackway to have one section, 3 for example, supported during its entire travel, one track being adjacent the weld joint, as seen in Fig. 1. The pipe rolls by gravity down the trackway, and when it reaches the interrupted portion, length 4 is no longer supported by the tracks, but is supported as a cantilever beam adjacent to the weld joint. The unbalanced force which tends to tip the pipe about the joint-supporting track as a fulcrum is overcome by providing means to hold the supported section on its supporting tracks. This is preferably accomplished by the use of a plurality of rollers 6 mounted in a framework 7, over the righthand track 1, Fig. 1. The roller mounting is vertically adjustable to vary the distance between the track and rollers, in order to accommodate pipes of different diameter, and is made long enough to support the pipe during its travel over the interrupted portion of the trackway. This roller backing holds the length 3 on the tracks when the pipe passes over the interrupted portion and the weight of length 4 sets up downwardly acting bending moments which create maximum stress in the weld joint.

At any instant when the weight of length 4 acts on weld joint 5, the upper portion of the joint is under a maximum tensile stress, and the diametrically opposed element is under maximum compression stress. As the pipe rotates, each element of its weld point is thus progressively subjected to maximum tensile and compression stress, and by rotating the pipe through a complete revolution, every element of the weld joint is thus stressed. By making the width of the interrupted portion such that the largest diameter pipe makes at least one complete revolution in passing over it, provision is made for testing pipes of all diameters.

When the pipes tested are of uniform lengths, the tracks adjacent the weld may be in a fixed position. The lengths, however, may vary, so that the weld joint in different pipes, or runs of pipe, will be variously positioned. In order to provide for such a contingency, there is provided a movable track in the interrupted portions of one or more tracks 2. As shown in Figs. 1 and 3, track sections 8 are mounted on a carriage 9 movable on rails 15 in alignment with the interrupted portion, the carriage being shifted as required to move track 8 to support the pipe adjacent the joint in the manner described. An abutment 10 may be provided at the loading side of the apparatus, against which the ends of pipes are placed to properly align them for their travel downwardly over the trackway. When rotation has carried the pipe beyond the interrupted portion, it is again wholly supported along its full length, and may be discharged by gravity upon any suitable receiving apparatus.

If desired, the joints may be further stressed by applying downward pressure to them. This may be done by a pneumatic hammer 11 adjustable longitudinally of the pipe length 4, the hammer being carried in a frame 12. As a pipe passes over the interrupted portion of the track, hammer 11 is operated to strike length 4 with downward blows, preferably at points adjacent its extended end, injury to the pipe being prevented in various ways, as by regulating the impact, making the face of the hammer large and of the contour of the pipe, facing it with wood, etc.

The testing apparatus may be situated at any desired point in the passage of the pipe through a mill, and by delivering the pipe consecutively to the apparatus, the process becomes continuous, and does not materially slow down or interfere with progress through a mill. Also, the pipes may be inspected while being tested in this manner, so that in effect these two steps are combined into one.

The invention provides a rapid, efficient and economical testing of weld joints between lengths of multiple welded pipe, in which each element of the joint is subjected to proper maximum tensile and compression stress. Defects in the joints may be detected, the process may be made continuous, does not interfere with normal mill operation, is free from the disadvantages and danger of impact testing, and the pipes are not injured.

According to the provisions of the patent statutes, I have explained the principle and mode of operation of my invention and have illustrated and described what I now consider to represent its best embodiment. However, I desire to have it understood that, within the scope of the appended claims the invention may be practiced otherwise than as specifically shown and described.

I claim:

1. An apparatus for testing the joints of multiple girt welded pipe, comprising means for supporting a multiple girt welded pipe as a simple beam with its joint subjected to bending stresses, said pipe being laterally rotatable on said support, and means associated with said supporting means for applying to the pipe while it is rotated a load at an unsupported point thereof to progressively subject a girt weld thereof to both tension and compression stresses.

2. An apparatus for testing the joints of multiple girt welded pipe, comprising means for supporting one length of a multiple girt welded pipe with another length projecting beyond the support as a cantilever beam to set up bending stresses in a girt joint between said lengths, said pipe being laterally rotatable on said supports, and means associated with said supporting means for applying a load to said unsupported length while the pipe is being rotated to progressively subject said weld to both tension and compression stresses.

In testimony whereof, I sign my name.

HENRY D. SCOTT.